(12) United States Patent
Yuan

(10) Patent No.: US 9,983,379 B2
(45) Date of Patent: May 29, 2018

(54) CONVENIENT-TO-ADJUST EXTENSION RING AND CAMERA LENS FILTER BRACKET

(71) Applicant: ZHUHAI CHUANFU OPTICAL TECHNOLOGY CO., LTD, Zhuhai, Guangdong (CN)

(72) Inventor: Guokui Yuan, Guangdong (CN)

(73) Assignee: ZHUHAI CHUANFU OPTICAL TECHNOLOGY CO., LTD, Zhuhai (CN)

( * ) Notice: Subject to any disclaimer, the term of this patent is extended or adjusted under 35 U.S.C. 154(b) by 0 days. days.

(21) Appl. No.: 15/315,375

(22) PCT Filed: Jan. 5, 2015

(86) PCT No.: PCT/CN2015/070090
§ 371 (c)(1),
(2) Date: Nov. 30, 2016

(87) PCT Pub. No.: WO2016/065740
PCT Pub. Date: May 6, 2016

(65) Prior Publication Data
US 2017/0192193 A1    Jul. 6, 2017

(30) Foreign Application Priority Data
Oct. 30, 2014  (CN) .................... 2014 2 0637340 U

(51) Int. Cl.
*G03B 17/00* (2006.01)
*G02B 7/00* (2006.01)
(Continued)

(52) U.S. Cl.
CPC ............ *G02B 7/006* (2013.01); *G03B 17/12* (2013.01); *G03B 17/14* (2013.01); *G02B 7/102* (2013.01);
(Continued)

(58) Field of Classification Search
CPC ..................................................... G03B 17/04
(Continued)

(56) References Cited

U.S. PATENT DOCUMENTS

2017/0192193 A1* 7/2017 Yuan ..................... G02B 7/006

FOREIGN PATENT DOCUMENTS

| CN | 101806947 | * | 8/2010 | ............. G01B 11/00 |
| CN | 101806947 A | | 8/2010 | |

(Continued)

OTHER PUBLICATIONS

International Search Report of PCT Patent Application No. PCT/CN2015/010090 dated Aug. 5, 2015.
(Continued)

*Primary Examiner* — Clayton E Laballe
*Assistant Examiner* — Kevin Butler

(57) ABSTRACT

The disclosure relates to a convenient-to-adjust extension ring and a camera lens filter bracket. The extension ring comprises an extension ring body, and a moving ring capable of rotating is arranged on the extension ring body; an axis of the moving ring is the same as an axis of the extension ring body, and first gear teeth are arranged on its circumferential surface; at least one adjusting knob capable of rotating is arranged on a lateral surface of the extension ring body, the adjusting knob is partially positioned in the extension ring body, and second gear teeth are arranged on its circumferential surface; and the second gear teeth are directly matched and meshed with the first gear teeth, or form indirect transmission connection with the first gear teeth through a gear set. The extension ring has advantage of easiness for machining and production.

4 Claims, 4 Drawing Sheets

(51) Int. Cl.
*G03B 17/12* (2006.01)
*G03B 17/14* (2006.01)
G03B 17/02 (2006.01)
G02B 7/10 (2006.01)
G03B 17/04 (2006.01)

(52) U.S. Cl.
CPC .............. *G03B 17/00* (2013.01); *G03B 17/02* (2013.01); *G03B 17/04* (2013.01)

(58) Field of Classification Search
USPC ........................................................ 396/448
See application file for complete search history.

(56) References Cited

FOREIGN PATENT DOCUMENTS

| | | | | |
|---|---|---|---|---|
| CN | 201936055 | * | 8/2011 | .............. G02B 7/04 |
| CN | 201936055 | U | 8/2011 | |
| CN | 103135322 | A | 6/2013 | |
| JP | 2000249888 | A | 9/2000 | |

OTHER PUBLICATIONS

Patent Evaluation Report of counterpart Chinese Utility Model Patent No. ZL201420637340.0 completed on Nov. 9, 2016.

\* cited by examiner

CONVENIENT-TO-ADJUST EXTENSION RING AND CAMERA LENS FILTER BRACKET

TECHNICAL FIELD

The disclosure relates to the technical field of camera lenses of shooting equipment, and in particular to a convenient-to-adjust extension ring and a camera lens filter bracket.

BACKGROUND

At present, different lenses are usually mounted on camera lenses of existing shooting equipment such as cameras and video cameras to achieve different effects through filter brackets in using processes; and extension rings are arranged on these existing filter brackets, moving rings capable of rotating are arranged on the extension rings, and during use, different filters, such as polarizers and starbursts, are mounted on the moving rings to meet different light effect requirements.

SUMMARY

However, lenses are also inserted into lens slots of existing filter brackets during use, and then the lenses are very close to extension rings, so that users may not rotate the extension rings with hands (fingers) to drive filters to rotate to adjust angles of the filters to meet different light effect requirements through gaps therebetween in using processes, it is hard to operate and even impossible to operate, and it is also meaningless to mount the filters.

In order to solve the problem in a conventional art, the disclosure provides a convenient-to-adjust extension ring of which a moving ring may be driven to rotate to adjust an angle of a filter to meet different light effect requirements only by operating a rotating adjusting knob and which is easy, convenient and rapid to operate, simple in structure and easy to machine and produce and has high market competitiveness, as well as a camera lens filter bracket employing the extension ring.

In order to solve the technical problem, the technical solution of the disclosure is implemented as follows.

A convenient-to-adjust extension ring may comprise an extension ring body, and a moving ring capable of rotating may be arranged on the extension ring body; an axis of the moving ring may be the same as an axis of the extension ring body, and first gear teeth may be arranged on its circumferential surface; at least one adjusting knob capable of rotating may be arranged on a lateral surface of the extension ring body, the adjusting knob may be partially positioned in the extension ring body, and second gear teeth may be arranged on its circumferential surface; and the second gear teeth may be directly matched and meshed with the first gear teeth, or may form indirect transmission connection with the first gear teeth through a gear set.

Furthermore, an annular mounting cavity and an annular locking ring may be arranged on an outward side of the extension ring body, the annular locking ring may be detachably mounted in the annular mounting cavity, and the moving ring may be arranged in a cavity body formed by the annular mounting cavity and the annular locking ring in a rotating manner.

Furthermore, a mounting nick may be formed in the lateral surface of the extension ring body, the adjusting knob may be arranged on the mounting nick through a rotating shaft in the rotating manner, and may partially extend into the cavity body formed by the annular mounting cavity and the annular locking ring, and its second gear teeth may be directly matched and meshed with the first gear teeth of the moving ring.

Furthermore, two opposite adjusting knobs capable of rotating may be arranged on the lateral surface of the extension ring body, the two adjusting knobs may be partially positioned in the extension ring body, and their second gear teeth may be directly matched and meshed with the first gear teeth, or may form indirect transmission connection with the first gear teeth through the gear set.

A camera lens filter bracket may comprise a filter bracket, and the convenient-to-adjust extension ring of the disclosure may be arranged on the filter bracket.

The disclosure has the following beneficial effects.

According to the technical solution of the disclosure, a user may drive the moving ring to rotate to drive a filter on the moving ring to rotate to adjust an angle of the filter to meet different light effect requirements according to a practical requirement only by operating the rotating adjusting knob in a using process, so that simplicity, convenience and rapidness for operation, simple structure, easiness for machining and production and high market competitiveness are ensured, a light leakage phenomenon is also avoided, and a light filtering effect is ensured.

DETAILED DESCRIPTION

In order to make a purpose, technical solution and advantages of the disclosure clearer, the disclosure will be further described below with reference to the drawings and embodiments in detail. It should be understood that specific embodiments described here are only adopted to explain the disclosure and not intended to limit the disclosure.

Figure 1:
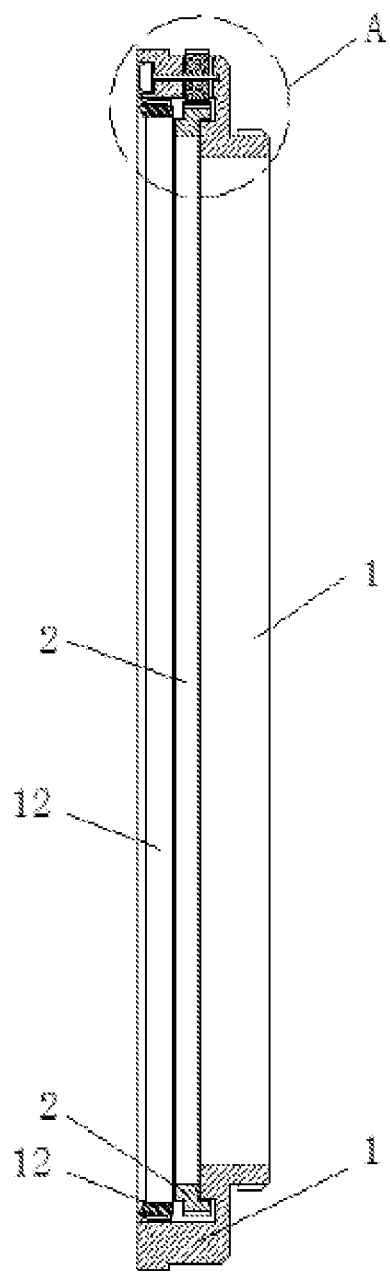
FIG. 1 is a sectional structure diagram of a convenient-to-adjust extension ring embodiment according to the disclosure.
Figure 2:
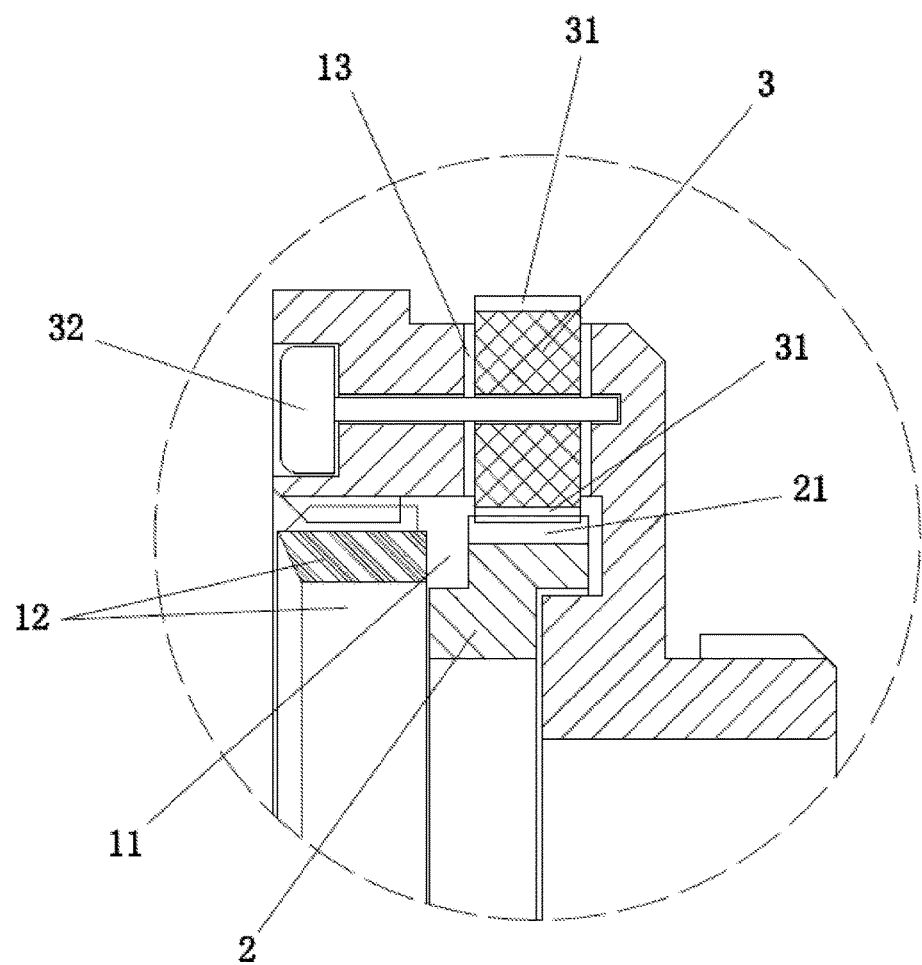
FIG. 2 is an amplified structure diagram of part A in FIG. 1.
Figure 3:
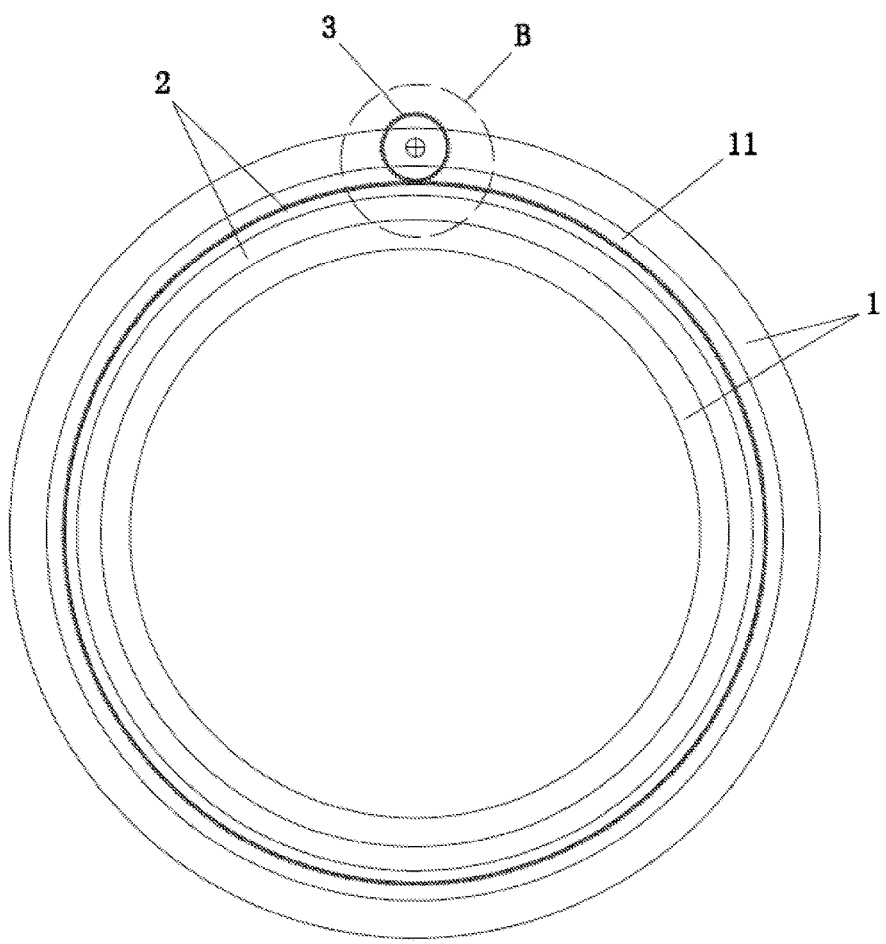
FIG. 3 is a structure diagram of a convenient-to-adjust extension ring embodiment of which an annular locking ring is disassembled according to the disclosure.
Figure 4:
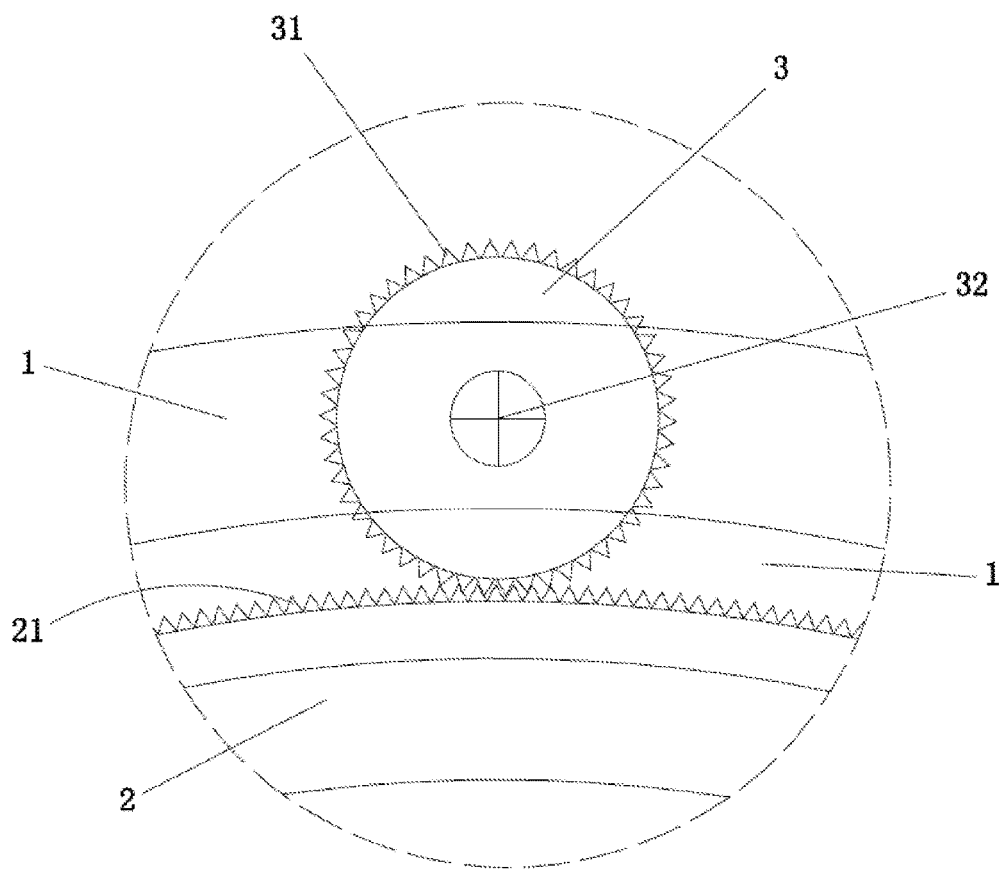
FIG. 4 is an amplified structure diagram of part B in FIG. 3.

As shown in FIG. 1 to FIG. 4:

a convenient-to-adjust extension ring of the embodiment of the disclosure comprises an extension ring body 1, and a moving ring 2 capable of rotating is arranged on the extension ring body 1; an axis of the moving ring 2 is the same as an axis of the extension ring body 1, and first gear teeth 21 are arranged on its circumferential surface; at least one adjusting knob 3 capable of rotating is arranged on a lateral surface of the extension ring body 1, the adjusting knob 3 is partially positioned in the extension ring body 1, and second gear teeth 31 are arranged on its circumferential surface; and the second gear teeth 31 are directly matched and meshed with the first gear teeth 21. A specific structure may be as follows: an annular mounting cavity 11 and an annular locking ring 12 are arranged on an outward side of the extension ring body 1, the annular locking ring 12 is detachably mounted in the annular mounting cavity 11, and the moving ring 2 is arranged in a cavity body formed by the annular mounting cavity 11 and the annular locking ring 12 in a rotating manner; and a thread (not shown in the figures) for fixed connection with a filter is arranged on an inner lateral surface of the moving ring 2. A mounting nick 13 is formed in the lateral surface of the extension ring body 1, the adjusting knob 3 is arranged on the mounting nick 13 through a rotating shaft (such as a threaded rod) 32 in the rotating manner, and partially extends into the cavity body formed by the annular mounting cavity 11 and the annular locking ring 12, and its second gear teeth 31 are directly matched and meshed with the first gear teeth 21 of the moving ring 2.

When the extension ring of the disclosure is used, the extension ring is mounted on a camera lens filter bracket at first, then the filter (such as a polarizer and a starburst) is mounted on the moving ring 2 of the extension ring, and a filter lens is finally inserted into a lens clamping slot of the camera lens filter bracket; and the user may drive the moving ring 2 to rotate to drive the filter on the moving ring 2 to rotate to adjust an angle of the filter to meet different light effect requirements according to a practical requirement only by operating the rotating adjusting knob 3 in a using process, so that simplicity, convenience and rapidness for operation, simple structure, easiness for machining and production and high market competitiveness are ensured, a light leakage phenomenon is also avoided, and a light filtering effect is ensured.

Of course, the second gear teeth 31 may also form indirect transmission connection with the first gear teeth 21 through a gear set, and the gear set is arranged in the extension ring body 1, and may consist of one or more gears in transmission connection.

In addition, two opposite adjusting knobs 3 capable of rotating may be arranged on the lateral surface of the extension ring body 1, the two adjusting knobs 3 are both partially positioned in the extension ring body 1, and their second gear teeth 31 are directly matched and meshed with the first gear teeth 21, or form indirect transmission connection with the first gear teeth 21 through the gear set. In such a manner, the user may execute adjusting operation with the left or right hand, so that higher flexibility and more convenience for operation are achieved.

The disclosure further discloses a camera lens filter bracket, which comprises a filter bracket, the convenient-to-adjust extension ring of the disclosure being arranged on the filter bracket.

The above is the preferred implementation mode of the disclosure, it is important to note that those skilled in the art may also make a plurality of improvements and embellishments without departing from the principle of the disclosure, and these improvements and embellishments shall also fall within the scope of protection of the disclosure.

What is claimed is:

1. A convenient-to-adjust extension ring, comprising an extension ring body (1), wherein a moving ring (2) capable of rotating is arranged on the extension ring body (1); an axis of the moving ring (2) the same as an axis of the extension ring body (1), and first gear teeth (21) are arranged on its circumferential surface; at least one adjusting knob (3) capable of rotating is arranged on a lateral surface of the extension ring body (1), the adjusting knob (3) is partially positioned in the extension ring body (1), and second gear teeth (31) are arranged on its circumferential surface; and the second gear teeth (31) are directly matched and meshed with the first gear teeth (21), or form indirect transmission connection with the first gear teeth (21) through a gear set;

wherein an annular mounting cavity (11) and an annular locking ring (12) are arranged on an outward side of the extension ring body (1), the annular locking ring (12) is detachably mounted in the annular mounting cavity (11), and the moving ring (2) is arranged in a cavity body formed by the annular mounting cavity (11) and the annular locking ring (12) in a rotating manner.

2. The convenient-to-adjust extension ring according to claim 1, wherein a mounting nick (13) is formed in the lateral surface of the extension ring body (1), the adjusting knob (3) is arranged on the mounting nick (13) through a rotating shaft (32) in the rotating manner, and partially extends into the cavity body formed by the annular mounting cavity (11) and the annular locking ring (12), and its second gear teeth (31) are directly matched and meshed with the first gear teeth (21) of the moving ring (2).

3. The convenient-to-adjust extension ring according to claim 1, wherein two opposite adjusting knobs (3) capable of rotating are arranged on the lateral surface of the extension ring body (1), the two adjusting knobs (3) are both partially positioned in the extension ring body (1), and their second gear teeth (31) are directly matched and meshed with the first gear teeth (21), or form indirect transmission connection with the first gear teeth (21) through the gear set.

4. A camera lens filter bracket, comprising a filter bracket, wherein the convenient-to-adjust extension ring according to claim 1 is arranged on the filter bracket.

* * * * *